United States Patent
Niemi et al.

(10) Patent No.: US 10,573,136 B2
(45) Date of Patent: Feb. 25, 2020

(54) CALIBRATING A VIBRATIONAL OUTPUT DEVICE

(71) Applicant: Microsoft Technology Licensing, LLC, Redmond, WA (US)

(72) Inventors: Tuomas Erkki Niemi, Sammamish, WA (US); Jani Samuli Kuivalainen, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/693,024

(22) Filed: Aug. 31, 2017

(65) Prior Publication Data
US 2019/0066458 A1    Feb. 28, 2019

(51) Int. Cl.
*G08B 6/00*    (2006.01)
*G06F 3/16*    (2006.01)
*H04R 1/08*    (2006.01)
*G06F 3/01*    (2006.01)

(52) U.S. Cl.
CPC ............. *G08B 6/00* (2013.01); *G06F 3/16* (2013.01); *H04R 1/08* (2013.01); *G06F 3/016* (2013.01)

(58) Field of Classification Search
CPC .... G08B 6/00; H04R 1/08; G06F 3/16; G06F 3/016
USPC ........................................... 340/407.1, 407.2
See application file for complete search history.

(56) References Cited

U.S. PATENT DOCUMENTS

| | | | |
|---|---|---|---|
| 2009/0002939 A1 | 1/2009 | Baugh et al. | |
| 2011/0075835 A1* | 3/2011 | Hill | H04M 1/72563 379/418 |
| 2012/0162113 A1* | 6/2012 | Lee | G08B 6/00 345/173 |
| 2012/0299859 A1* | 11/2012 | Kinoshita | G06F 3/016 345/173 |
| 2013/0033366 A1* | 2/2013 | McDonough | H04M 19/041 340/407.1 |
| 2013/0076286 A1 | 3/2013 | Patton et al. | |
| 2013/0088339 A1* | 4/2013 | Lim | H04M 19/047 340/407.1 |
| 2013/0229267 A1* | 9/2013 | Novak | G06F 3/014 340/12.5 |
| 2014/0015652 A1* | 1/2014 | Han | G08B 6/00 340/407.1 |

(Continued)

OTHER PUBLICATIONS

"International Search Report and Written Opinion Issued in PCT Application No. PCT/US18/038710", dated Sep. 3, 2018, 11 Pages (MS# 402819-WO-PCT).

*Primary Examiner* — Ojiako K Nwugo
(74) *Attorney, Agent, or Firm* — Alleman Hall Creasman & Tuttle LLP

(57) ABSTRACT

Examples are disclosed herein that relate to avoiding mechanical noise from operation of a vibrational output device. One example provides a computing device including a processor and a storage device storing instructions executable by the processor to vary a drive voltage applied to a vibrational output device, receive acoustic data, and from the acoustic data detect a noise signal from the vibrational output device as the drive voltage is varied. The instructions are further executable to, based upon the detected noise signal, select an operational drive voltage for the vibrational output device, and operate the vibrational output device using the operational drive voltage.

20 Claims, 5 Drawing Sheets

(56) References Cited

U.S. PATENT DOCUMENTS

| | | |
|---|---|---|
| 2014/0169581 A1 | 6/2014 | Osako et al. |
| 2014/0218183 A1* | 8/2014 | Van Schyndel ......... G06F 3/016 340/407.1 |
| 2015/0116519 A1* | 4/2015 | Jarske ..................... H04N 5/357 348/208.12 |
| 2015/0364024 A1* | 12/2015 | Seese ................. G08B 21/0484 340/573.1 |
| 2016/0085303 A1* | 3/2016 | Israr ..................... H04N 21/426 340/407.2 |
| 2018/0061192 A1* | 3/2018 | Chen ....................... G06F 3/016 |

* cited by examiner

CALIBRATING A VIBRATIONAL OUTPUT DEVICE

BACKGROUND

Portable computing devices, such as smartphones, tablets, and laptops, may utilize a vibrational output device to provide haptic feedback. Vibrational outputs may be used in response to events such as alarms, incoming calls, received messages, and notifications, as well as for haptic feedback for actuation of buttons or user interface elements.

SUMMARY

Examples are disclosed herein that relate to avoiding mechanical noise from operation of a vibrational output device. One example provides a computing device including a processor and a storage device storing instructions executable by the processor to vary a drive voltage applied to a vibrational output device, receive acoustic data, and from the acoustic data detect a noise signal from the vibrational output device as the drive voltage is varied. The instructions are further executable to, based upon the detected noise signal, select an operational drive voltage for the vibrational output device, and operate the vibrational output device using the operational drive voltage.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, a portable device may utilize a vibrational output device to provide haptic outputs in response to various device events. As one example, a vibrational output device may take the form of an eccentric rotating mass vibrator, which may include an off-center mass mounted to a motor, such that operation of the motor causes the weight to move in an off-balanced manner, thereby producing vibration. A vibrational output device also may take the form of a linear resonant actuator, in which a motor drives a coil pressed against a moving mass connected to a spring, such that the device vibrates when the coil is driven at the resonant frequency of the spring. In either example, the resulting vibration may be easily noticeable by a person carrying the portable device but only slightly audible, if at all, to other people nearby.

Figure 1A:
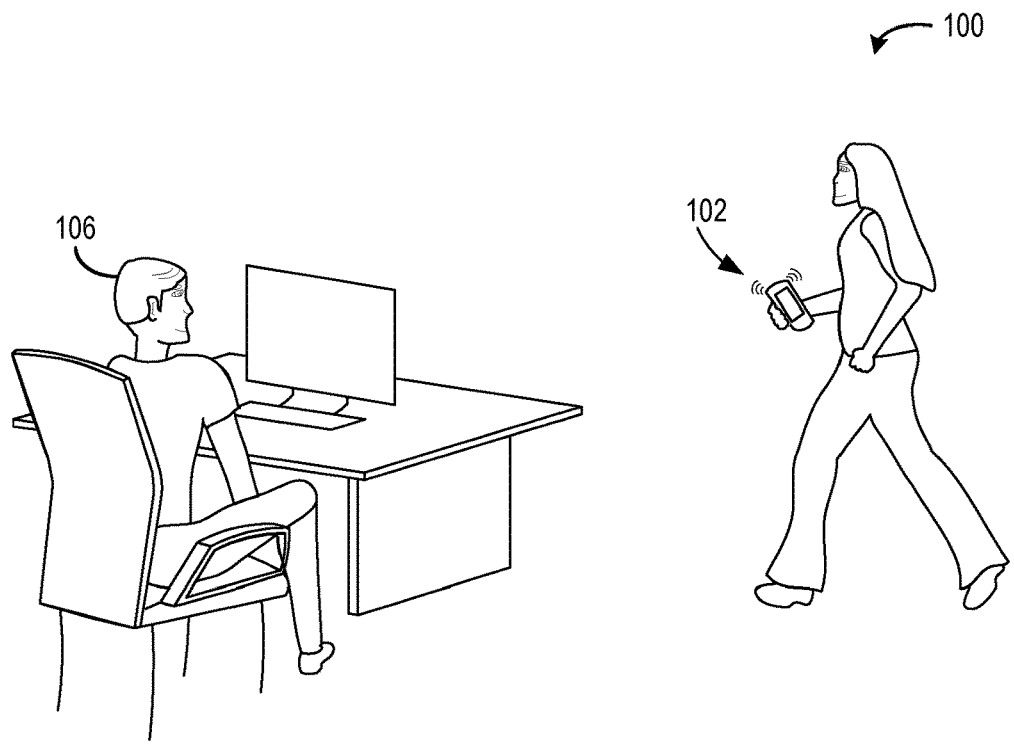
FIGS. 1A and 1B show example scenarios in which computing devices respectively provide vibrational outputs without and with mechanical rattle.
Figure 1B:
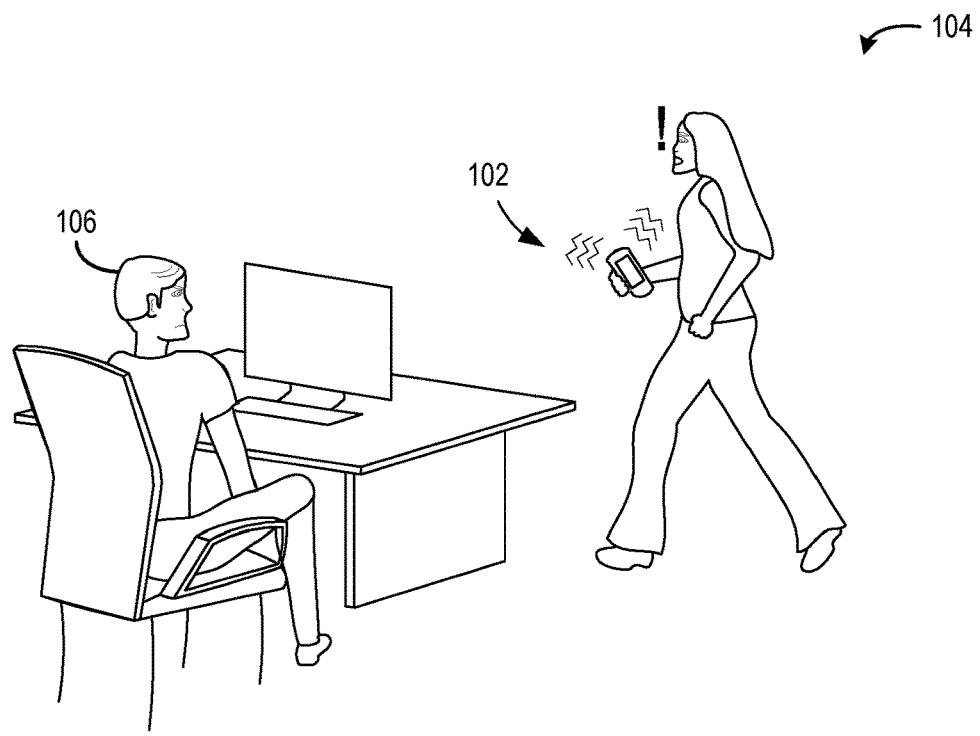

A magnitude of the vibration is a function of a drive voltage applied to the vibrational output device, such that higher drive voltages can achieve stronger vibrations. The use of higher drive voltages may be helpful, for example, to achieve a desired vibrational intensity from a smaller vibrational output device. However, if driven too hard, an eccentric rotating mass or a linear resonant actuator may contact a housing of the vibrational output device, and thereby cause rattling noise. This is distinguished from the expected noise of the vibration itself, as well as from rattling noise that is contributed by any external sources, such as rattling of the device against a hard surface. The resulting rattling noise may be distracting to the user and nearby people. FIGS. 1A and 1B respectively show scenario 100 in which a mobile device 102 is operating at a drive voltage that does not cause an audible rattling noise, and scenario 104 in which the vibrational output device is operating at a drive voltage that produces an audible rattling noise that distracts another person 106.

Driving a vibrational output device with a sufficiently low voltage may help to avoid such rattle. However, it may be challenging to select a drive voltage that provides suitable vibrational feedback while avoiding noise. One approach is to use a voltage-current sensor, or V/I sensor, to measure the resonant frequency of the vibrational output device, and select a fixed drive voltage based on the resonant frequency. However, because of manufacturing tolerances, optimal driving voltages across vibrational output devices may vary. For example, vibrational output performance may vary with the size of the vibrational output device, the tolerances of springs in the vibrational output device, and other factors. Such variability across a population of vibrational output devices may lead to setting the drive voltage at lower value than desired for a population of computing devices incorporating the vibrational output devices so that the overall population avoids rattle. Further, even where this is done, performance of a vibrational output device may change over a device lifetime, and may begin to produce noise at a later point in time.

Accordingly, examples are disclosed herein that relate to calibrating the vibrational output device in a manner that may help to address the issues described above. Briefly, acoustic data may be used to calibrate a vibrational output device drive voltage such that the noise from the vibrational output device remains below a noise threshold. During calibration, a drive voltage is adjusted while monitoring for acoustic noise from the vibrational output device. In this manner, a drive voltage at which the detected acoustic noise is close to, but below, the noise threshold may be identified and set as an operative drive voltage. This process may be performed for each computing device during manufacturing to calibrate the vibrational output device of each computing device individually, thereby avoiding the use of an undesirably low drive voltage selected to accommodate a population of devices. This process may also be performed during use of the device after manufacturing, either as a user-initiated process or automatically.

Figure 2:
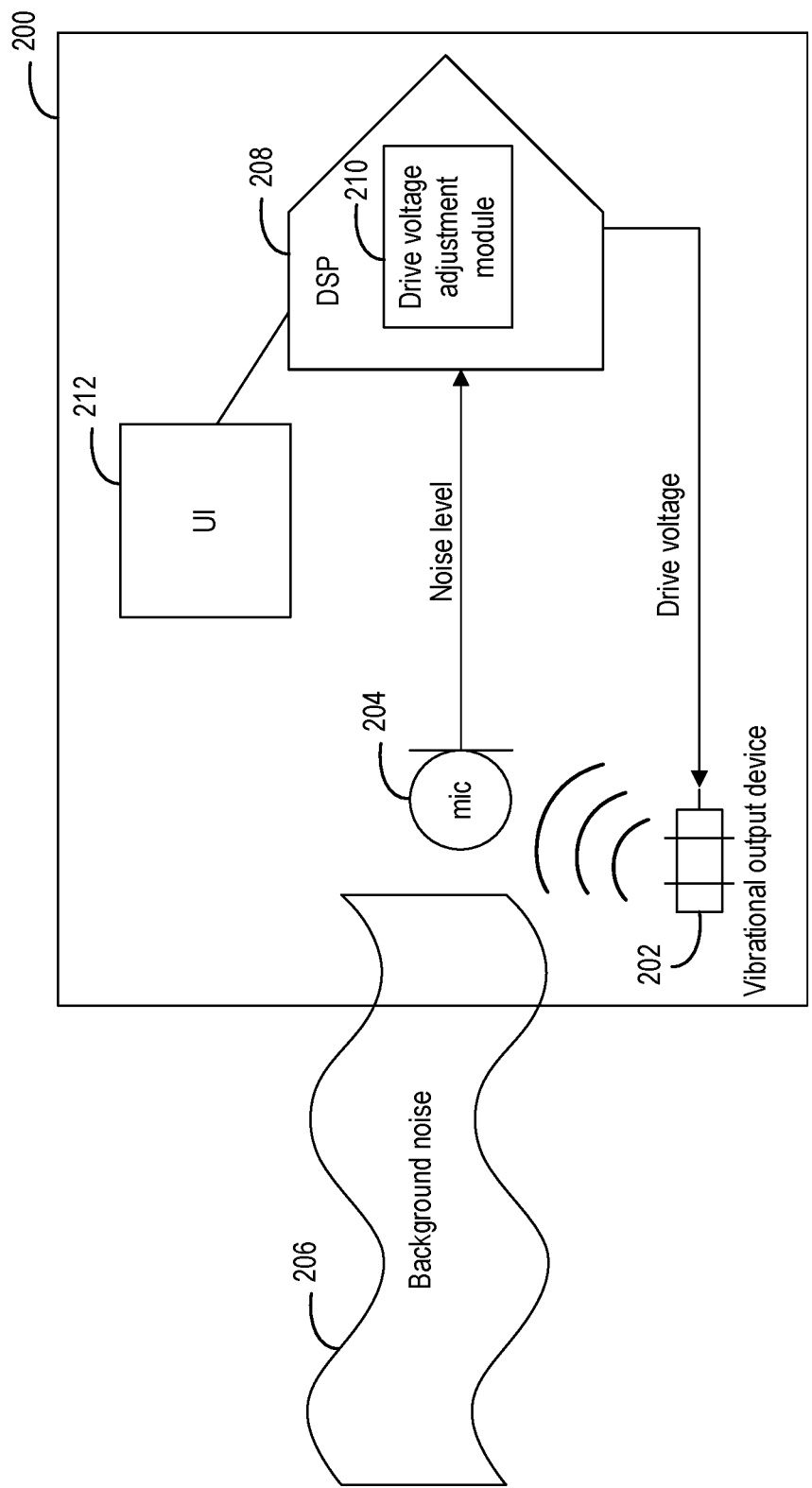
FIG. 2 shows a block diagram of an example computing device comprising a vibrational output device.

FIG. 2 schematically shows a block diagram of an example computing device 200 comprising a vibrational output device 202. Computing device 200 may represent a smartphone, tablet, laptop, mouse, game controller, or any other suitable device that utilizes vibrational outputs. FIG. 2 illustrates components used for an example calibration process, and omits other structures.

Computing device 200 may include a microphone system 204 comprising one or more microphones. As described in more detail below, the microphone system 204 may be utilized to detect background noise 206 and mechanical noise from the vibrational output device 202 in a calibration process. In other examples, a microphone system external to computing device 200 may be used.

Acoustic input from microphone system 204 is received at a digital signal processor (DSP) 208, which performs various signal processing for helping to identifying mechanical noise (a "noise signal") from the vibrational output device. DSP 208 further includes a drive voltage adjustment module 210 that is configured to analyze the identified mechanical noise received via microphone system 204, and adjust the drive voltage based on analysis of the acoustic signals. DSP 208 may perform any suitable signal processing to identify mechanical noise from vibrational output device 202. For example, DSP 208 may apply various filters when vibrational output device 202 is active to pass a characteristic mechanical noise frequency arising from the vibrational output device 202 (which may have stronger high-frequency components than noise from computing device 200 rattling against a table or other surface) while attenuating other frequencies comprising background noise 206.

Background noise 206 may include background noise not arising from the vibrational output device, such as ambient environmental sounds and sounds arising from other components of computing device 200, as well as background noise arising from vibrational output device 200, e.g. where computing device 200 is rattling against a tabletop during operation of vibrational output device 202.

Background noise not arising from vibrational output device 202 may be attenuated, for example, by sampling the background noise at times when vibrational output device 202 is not active (e.g. between vibration pulses), and then subtracting or otherwise computationally compensating for the background noise from signals received when vibrational output device 202 is active. Background noise arising from the vibrational output device 202 may be attenuated, for example, by utilizing a bandpass filter to pass frequencies specifically associated with the mechanical rattle of the vibrational output device 202, and/or by transforming the time-domain signal from the microphone system to a frequency-domain signal and then analyzing the specific frequencies associated with the mechanical rattle. Such frequencies may be determined during device manufacturing (e.g. by storing and analyzing audio samples of the rattle acquired during calibration). After such background noise-reducing processes, the drive voltage adjustment module may compare the resulting signal to one or more noise thresholds to determine if the vibrational output device is producing mechanical noise of a threshold magnitude, and if so, set a drive voltage based upon the determination.

In some examples, individual frequency components may be separated for analysis, such as by performing a Fourier transform (e.g. using a fast Fourier transform or other suitable algorithm) on the acoustic data from microphone system 204. After transforming the input to the frequency domain, a magnitude of the noise signal at one or more frequencies corresponding to the mechanical noise from vibrational output device 202 then may be compared to one or more corresponding thresholds for those intensities to help select a drive voltage. In other examples, psychoacoustical parameters of the noise signal may also be analyzed, including roughness, sharpness, and disturbance of the noise.

Drive voltage adjustment module 210 may sweep through a range of drive voltages, and analyze acoustic information received via microphone throughout the sweep. Drive voltage adjustment module 210 may adjust the voltage either upwardly or downwardly in such a process. Where the drive voltage is adjusted upwardly, drive voltage adjustment module 110 may increase the drive voltage progressively (continually, step-wise or in any other suitable manner) until the noise signal surpasses the threshold magnitude, and then set the drive voltage to just below the level at which the threshold noise was detected. Likewise, where the drive voltage is adjusted downwardly, drive voltage adjustment module 210 may progressively decrease the drive voltage, until the noise is no longer detected or the noise signal falls below a threshold magnitude, and then set the drive voltage at that level. In this manner, the drive voltage may be adjusted for each individual device of a population of devices during manufacturing, which may help to avoid issues that arise when setting a same drive voltage for a population of devices.

Figure 3:
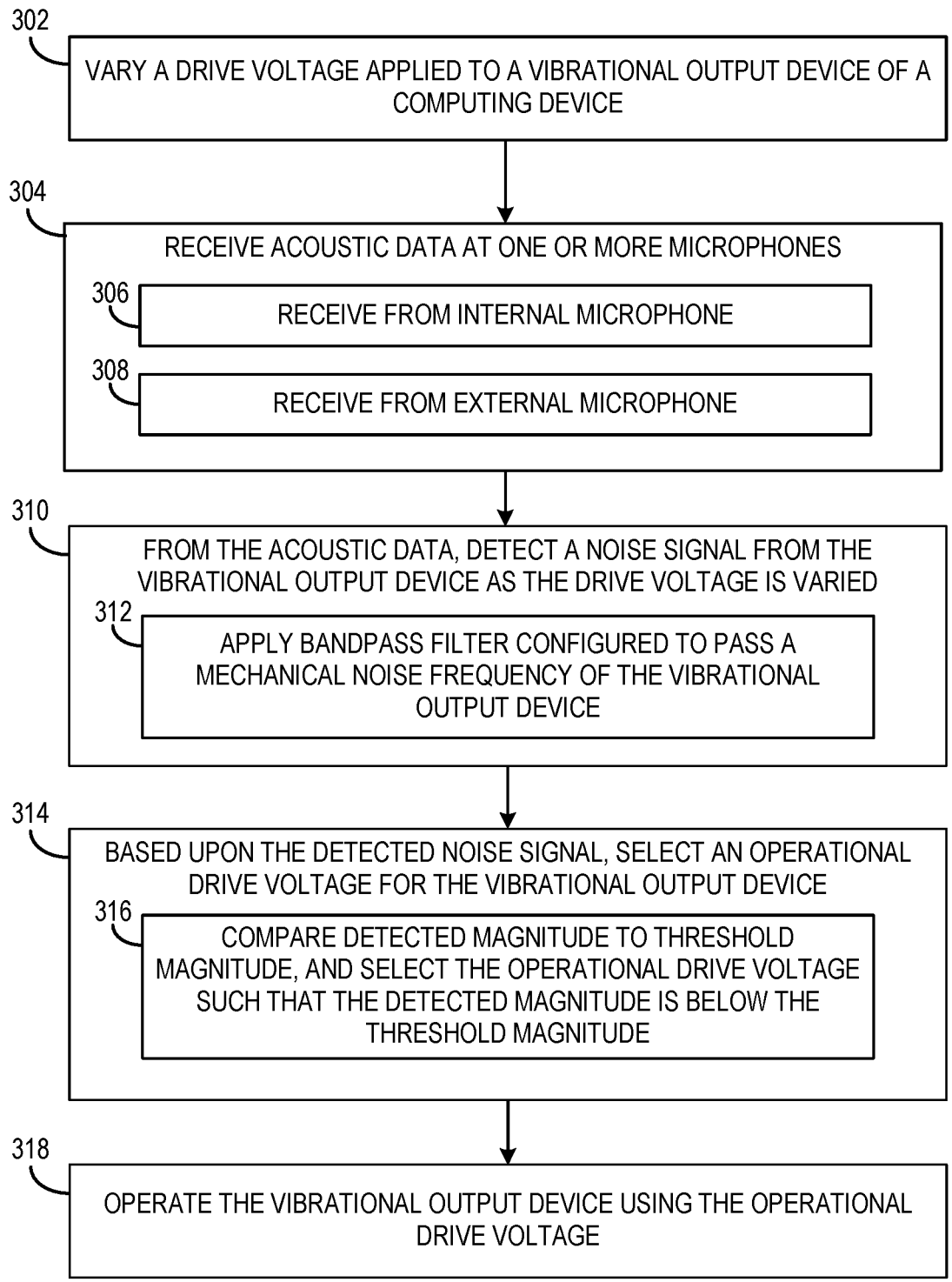
FIG. 3 is a flow diagram illustrating an example method for calibrating a vibrational output device during manufacturing.

FIG. 3 shows an example method 300 of calibrating a drive voltage for operating a vibrational output device during manufacturing. Method 300 may be performed on any suitable computing device that comprises a vibrational output device. At 302, method 300 includes varying a drive voltage applied to a vibrational output device of a computing device, and at 304, receiving acoustic data at one or more microphones while varying the drive voltage. In some examples, the acoustic data may be received via an internal microphone of the computing device at 306, while in other examples the acoustic data may be received via an external microphone at 308.

Method 300 further includes, at 310, detecting from the acoustic data a noise signal from the vibrational output device as the drive voltage is varied. The noise signal from the vibrational output device may be detected and analyzed in any suitable manner. For example, one or more filters may be applied, as indicated at 312. As another example, background noise may be sampled while the vibrational output device is not active (e.g. between vibration pulses), and this background noise may be subtracted from a noise signal received when the vibrational output device is active to increase a signal-to-noise ratio. Further, in some examples, a time-frequency domain transform algorithm (e.g. a Fourier transform) may be applied to extract frequency components from the acoustic input, which may allow individual characteristic frequency components of the noise signal to be analyzed, e.g. by comparing to a threshold for a specific frequency component. In yet other examples, psychoacoustic parameters of the noise signal may be analyzed, including roughness, sharpness, and disturbance (e.g. by magnitude at frequencies associated with such psychoacoustic parameters, a rate of change of the signal magnitude, etc.). Method 300 further includes, at 314, selecting, based upon the detected noise signal from the vibrational output device, an operational drive voltage for the vibrational output device. For example, as indicated at 316, this may include comparing a detected magnitude of the noise signal to a threshold magnitude, and selecting the operational drive voltage such that the detected magnitude is a desired amount below the threshold magnitude. Method 300 then includes operating the vibrational output device using the operational drive voltage, at 318.

As mentioned above, a vibrational output device may occasionally need recalibration at other times throughout its lifetime due, for example, to changes in performance. Calibration may be user-initiated, scheduled, or triggered in any other suitable manner. Referring again briefly to FIG. 2, computing device 200 comprises a user interface component 212 at which a user may select to perform a calibration process and/or adjust settings related to a calibration process (e.g. by defining events that trigger calibration, such as a specific time/date schedule and/or a dropping of the device or similar sudden acceleration event as determined from inertial sensor data, and/or by defining specific vibration events to use for calibration).

Figure 4:
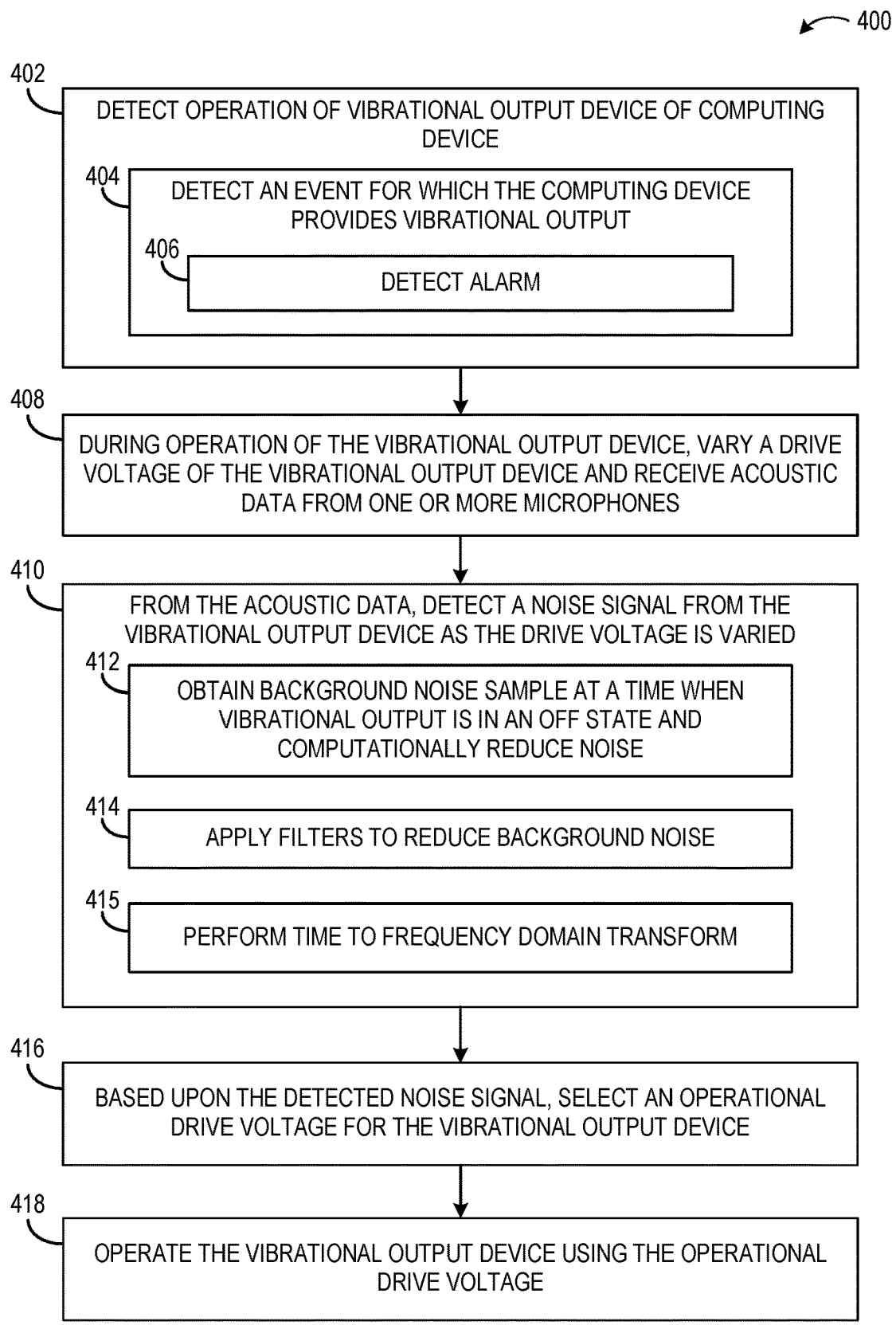
FIG. 4 is a flow diagram illustrating an example method for calibrating a vibrational output device during use.

FIG. 4 shows an example method 400 of calibrating a drive voltage for operating a vibrational output device during use. Method 400 includes, at 402, detecting operation of the vibrational output device of a computing device. This may include, for example, detecting an event for which the computing device provides vibrational output, as indicated at 404. Examples of such events include an alarm, as indicated at 406, an alert, an incoming call, a received message, a notification from an application, a calendar reminder, and/or any other suitable device event for which the computing device may provide vibrational output.

Method 400 further includes, at 408, during operation of the vibrational output device, varying a drive voltage of the vibrational output device, and receiving acoustic data from one or more microphones, e.g. an internal microphone of the computing device, while varying the voltage. At 410, method 400 includes, from the acoustic data, detecting a noise signal from the vibrational output device as the drive voltage is varied. Detecting the noise signal from the vibrational output device may include various processes to remove background noise from the vibrational output device mechanical noise signal. Such background noise may include environmental noise, and noise arising from the computing device itself (e.g. a sound of the computing device rattling against a hard surface such as a table during vibration, and/or an alarm sound output by a speaker). Environmental noise and device noise not arising from the vibrational output device may be reduced, as indicated at 412, by sampling the background noise while the vibrational output device is not operating and computationally reducing the noise based upon the samples acquired (e.g. by subtraction), and/or by applying filters to reduce characteristic frequencies of such noise, as indicated at 414. Whether the background noise sample is acquired while an acoustic alarm or other acoustic output is off or on may depend upon whether the alarm or other acoustic output will be on when the vibrational output device mechanical noise sample is acquired. Further, in some examples, a Fourier transform or other suitable transform may be used to transform the acoustic input from the microphone from the time domain to the frequency domain, as indicated at 415. In such an example, noise reduction and/or signal analysis may be performed at specific frequencies in the frequency domain, which may be informed by frequencies of noise signals of vibrational outputs received during manufacturing calibration. In some examples, the computing device may automatically perform noise cancellation for noises identified as originating within the computing device itself.

Such measurements may be repeated and accumulated over multiple occurrences of the vibrational output. In some examples, data from one or more inertial sensors of the computing device may be utilized to further inform the measurements. For example, noise data collected while a device is in a user's hand may be more useful than noise data collected while a device is set down onto a surface, due to possible rattling of the device against the surface. As such, inertial data and other sensor data (e.g. touch data) may be used to determine whether acoustic noise measurements are taken when the device is in hand.

After performing such noise reduction techniques, a detected magnitude of the noise signal (either as a sum of all frequencies or at characteristic frequencies of the vibrational output device mechanical) may be compared to a threshold magnitude to help determine a suitable drive voltage. Other factors may also be considered, such as the use of psychoacoustical models to analyze the roughness, sharpness, or disturbance of the detected noise signal. Thus, method 400 includes, at 416, based upon the detected noise signal, selecting an operational drive voltage for the vibrational output device, and operating the vibrational output device using the operational drive voltage, at 418. In some examples, different drive voltages may be calibrated for different events involving vibrational output.

Thus, according to the examples above, a drive voltage for a vibrational output device may be calibrated individually, as opposed to population-wide, both during manufacturing and over the useful lifetime of the device. This may allow individual drive voltages to be set to higher magnitudes than can be done when calibrating on a population-wide basis. In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
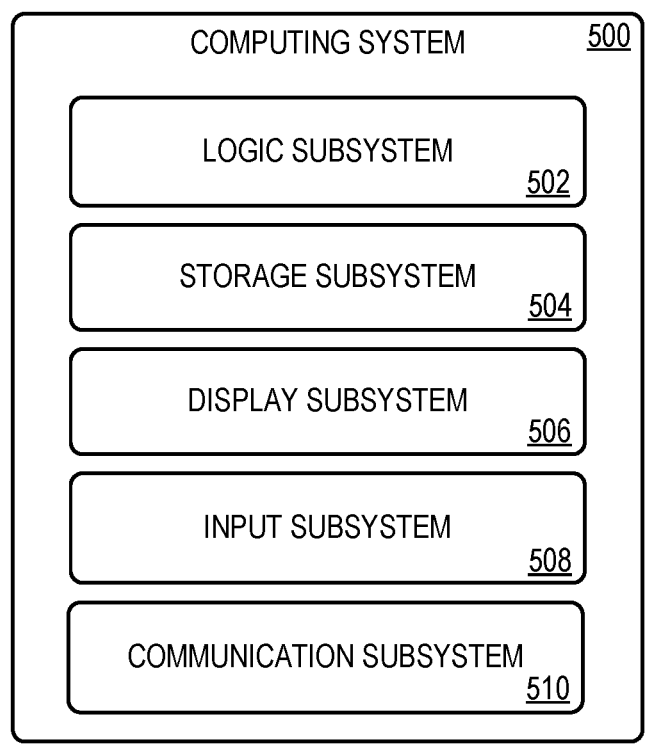
FIG. 5 shows a block diagram of an example computing system.

FIG. 5 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic subsystem 502 and a storage subsystem 504. Computing system 500 may optionally include a display subsystem 506, input subsystem 508, communication subsystem 510, and/or other components not shown in FIG. 5.

Logic subsystem 502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 502 may include one or more processors configured to execute software instructions. Additionally or alternatively, logic subsystem 502 may include one or more hardware or firmware logic machines configured to execute hardware or firmware instructions. Processors of logic subsystem 502 may be single-core or multi-core, and the instructions executed thereon may be configured for sequential, parallel, and/or distributed processing. Individual components of logic subsystem 502 optionally may be distributed among two or more separate devices, which may be remotely located and/or configured for coordinated processing. Aspects of logic subsystem 502 may be virtualized and executed by remotely accessible, networked computing devices configured in a cloud-computing configuration.

Storage subsystem 504 includes one or more physical devices configured to hold instructions executable by logic subsystem 502 to implement the methods and processes described herein. When such methods and processes are implemented, the state of storage subsystem 504 may be transformed—e.g., to hold different data.

Storage subsystem 504 may include removable and/or built-in devices. Storage subsystem 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 504 may include volatile, nonvolatile, dynamic, static, read/write, read-only, random-access, sequential-access, location-addressable, file-addressable, and/or content-addressable devices.

It will be appreciated that storage subsystem 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 506 and storage subsystem 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 506 may be used to present a visual representation of data held by storage subsystem 504. This visual representation may take the form of a graphical user interface (GUI). As the herein described methods and processes change the data held by the storage machine, and thus transform the state of the storage machine, the state of display subsystem 506 may likewise be transformed to visually represent changes in the underlying data. Display subsystem 506 may include one or more display devices utilizing virtually any type of technology. Such display devices may be combined with logic subsystem 502 and/or storage subsystem 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem 510 may be configured for communication via a wireless telephone network, or a wired or wireless local- or wide-area network. In some embodiments, the communication subsystem 510 may allow computing system 500 to send and/or receive messages to and/or from other devices via a network such as the Internet.

Another example provides a computing device comprising a processor, and a storage device storing instructions executable by the processor to vary a drive voltage applied to a vibrational output device, receive acoustic data, from the acoustic data, detect a noise signal from the vibrational output device as the drive voltage is varied, based upon the detected noise signal, select an operational drive voltage for the vibrational output device, and operate the vibrational output device using the operational drive voltage. The instructions may be additionally or alternatively executable to detect a noise signal by applying a bandpass filter configured to pass a mechanical noise frequency of the vibrational output device. The instructions may be additionally or alternatively executable to receive acoustic data from one or more microphones internal to the computing device. The instructions may be additionally or alternatively executable to receive acoustic data from one or more microphones external to the computing device. The instructions may be additionally or alternatively executable to compare a detected magnitude of the noise signal to a threshold magnitude, and select the operational drive voltage such that the detected magnitude of the noise signal is below the threshold magnitude. The instructions may be additionally or alternatively executable to calibrate the vibrational output device during manufacturing. The instructions may be additionally or alternatively executable to calibrate the vibrational output device during device use. The instructions may be additionally or alternatively executable to transform the acoustic data from a time domain to a frequency domain. The instructions may be additionally or alternatively executable to obtain a background noise level, and not perform a calibration of the vibrational output device based on the background noise level exceeding a threshold background noise level.

Another example provides a computing device comprising a vibrational output device, a microphone, a processor, and storage comprising instructions executable by the processor to vary a drive voltage applied to the vibrational output device, receive acoustic data via the microphone, from the acoustic data, detect a noise signal from the vibrational output device as the drive voltage is varied, based upon the detected noise signal, select an operational drive voltage for the vibrational output device, and operate the vibrational output device using the operational drive voltage. The instructions executable to detect a noise signal may additionally or alternatively include instructions executable to apply a bandpass filter to pass a mechanical noise frequency of the vibrational output device. The instructions may additionally or alternatively be executable to compare a detected magnitude of the noise signal to a threshold magnitude, and select the operational drive voltage such that the detected magnitude is below the threshold magnitude. The instructions may additionally or alternatively be executable to calibrate the vibrational output device during manufacturing. The instructions may be additionally or alternatively executable to calibrate the vibrational output device during ordinary use. The instructions may be additionally or alternatively executable to calibrate the vibrational output device based on user input. The instructions may additionally or alternatively be executable to obtain a background noise level, and not perform calibration based on the background noise level exceeding a threshold background noise level.

Another example provides, on a computing device, a method of selecting a drive voltage for operating a vibrational output device, the method comprising detecting operation of the vibrational output device, during operation of the vibrational output device, varying a drive voltage of the vibrational output device and receiving acoustic data from one or more microphones of the computing device, from the acoustic data, detecting a noise signal from the vibrational output device as the drive voltage is varied, based upon the detected noise signal, selecting an operational drive voltage for the vibrational output device, and operating the vibrational output device using the operational drive voltage. Detecting operation of the vibrational output device may additionally or alternatively include detecting an event for which the computing device provides vibrational output. The event may additionally or alternatively include an alarm. The method may additionally or alternatively include obtaining a background noise level at a time when acoustic output and vibrational output of the alarm are in an off state.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a processor; and
a storage device storing instructions executable by the processor to, during manufacturing of a mobile device,
vary a drive voltage applied to a vibrational output device of the mobile device by sweeping the drive voltage through a range of voltages,
receive acoustic data,
from the acoustic data, detect a noise signal arising from contact between the vibrational output device and another internal part of the mobile device as the drive voltage is swept through the range of voltages,
calibrate the vibrational output device by, based upon the detected noise signal, selecting an operational drive voltage for the vibrational output device, and
operate the vibrational output device using the operational drive voltage.

2. The computing device of claim 1, wherein the instructions are executable to detect a noise signal by applying a bandpass filter configured to pass a mechanical noise frequency of the vibrational output device.

3. The computing device of claim 1, wherein the instructions are executable to receive acoustic data from one or more microphones internal to the computing device.

4. The computing device of claim 1, wherein the instructions are further executable to compare a detected magnitude of the noise signal to a threshold magnitude, and select the operational drive voltage such that the detected magnitude of the noise signal is below the threshold magnitude.

5. The computing device of claim 1, wherein the instructions are executable to calibrate the vibrational output device during manufacturing.

6. The computing device of claim 1, wherein the instructions are further executable to transform the acoustic data from a time domain to a frequency domain.

7. The computing device of claim 1, wherein the instructions are further executable to obtain a background noise level, and not perform a calibration of the vibrational output device based on the background noise level exceeding a threshold background noise level.

8. The computing device of claim 1, wherein the computing device is the mobile device.

9. The computing device of claim 8, wherein the mobile device comprises one or more of a phone, a tablet, a laptop, a mouse, and a game controller.

10. A computing device comprising:
a vibrational output device;
a microphone;
a processor; and
storage comprising instructions executable by the processor to
vary a drive voltage applied to the vibrational output device by sweeping the drive voltage through a range of voltages,
receive acoustic data via the microphone,
from the acoustic data, detect a noise signal arising from contact between the vibrational output device and another internal part of the computing device as the drive voltage is swept through the range of voltages,
calibrate the vibrational output device by, based upon the detected noise signal, selecting an operational drive voltage for the vibrational output device, and
operate the vibrational output device using the operational drive voltage.

11. The computing device of claim 10, wherein the instructions executable to detect a noise signal comprises instructions executable to apply a bandpass filter to pass a mechanical noise frequency of the vibrational output device.

12. The computing device of claim 10, wherein the instructions are further executable to compare a detected magnitude of the noise signal to a threshold magnitude, and select the operational drive voltage such that the detected magnitude is below the threshold magnitude.

13. The computing device of claim 10, wherein the instructions are executable to calibrate the vibrational output device during manufacturing.

14. The computing device of claim 10, wherein the instructions are executable to calibrate the vibrational output device during ordinary use.

15. The computing device of claim 14, wherein the instructions are executable to calibrate the vibrational output device based on user input.

16. The computing device of claim 10, wherein the instructions are further executable to obtain a background noise level, and not perform calibration based on the background noise level exceeding a threshold background noise level.

17. The computing device of claim 10, wherein the instructions are further executable to attenuate noise arising from an external surface contacting the computing device due to vibration of the vibrational output device.

18. On a computing device, a method of selecting a drive voltage for operating a vibrational output device of a mobile device, the method comprising:
obtaining a background noise level;
when the background noise level does not exceed a threshold background noise level, then performing a calibration of the vibrational output device by during operation of the vibrational output device, varying a drive voltage of the vibrational output device of the mobile device and receiving acoustic data from one or more microphones of the computing device, from the acoustic data, detecting a noise signal arising from contact between the vibrational output device and another internal part of the mobile device as the drive voltage is varied, and calibrating the vibrational output device by, based upon the detected noise signal, selecting an operational drive voltage for the vibrational output device; and when the background noise level does exceed the threshold background noise level, then not performing the calibration of the vibrational output device.

19. The method of claim 18, wherein detecting operation of the vibrational output device comprises detecting an event for which the computing device provides vibrational output.

20. The method of claim 18, further comprising obtaining the background noise level at a time when acoustic output and vibrational output are in an off state.

* * * * *